United States Patent [19]

Berisch et al.

[11] Patent Number: 5,232,272
[45] Date of Patent: Aug. 3, 1993

[54] HYDRAULIC BRAKE SYSTEM FOR AVOIDING HIGH BRAKE OR TRACTION SLIP VALUES

[76] Inventors: Volker Berisch, Schone Aussicht 4, 6229 Walluf 1; Derek Lowe, Forsthausstrasse 4, 6246 Glashutten 1, both of Fed. Rep. of Germany

[21] Appl. No.: 720,471
[22] PCT Filed: Oct. 18, 1990
[86] PCT No.: PCT/EP90/01760
 § 371 Date: Aug. 12, 1991
 § 102(e) Date: Aug. 12, 1991
[87] PCT Pub. No.: WO91/07299
 PCT Pub. Date: May 30, 1991

[30] Foreign Application Priority Data

Nov. 8, 1989 [DE] Fed. Rep. of Germany ....... 3937142

[51] Int. Cl.$^5$ .......................... B60T 8/32; B60T 8/48; B60K 28/16
[52] U.S. Cl. .............................. 303/113.3; 303/116.1; 303/119.1
[58] Field of Search ........ 303/119 R, 116 R, 113 TR, 303/113 TB, 113 R, 115 R, 68-69, 116 SP, 116 WP, 116 PC, 119 SV, DIG. 3, DIG. 4, 100, 111, 92, DIG. 5, DIG. 6, 113.1-119.2; 188/181 R, 181 A

[56] References Cited

U.S. PATENT DOCUMENTS

| | | |
|---|---|---|
| 4,826,258 | 5/1989 | Ocvirk et al. ................. 303/113 TR |
| 4,840,436 | 6/1989 | Burgdorf et al. ............. 303/113 TR |
| 4,872,732 | 10/1989 | Stegmaier ..................... 303/113 TB |
| 4,898,430 | 2/1990 | Kelt et al. ...................... 303/113 TR |
| 4,900,105 | 2/1990 | Burgdorf et al. ............. 303/113 TR |
| 4,919,495 | 4/1990 | Kircher et al. ................ 303/113 R |
| 4,940,293 | 7/1990 | Burckhardt et al. ......... 303/113 TR |
| 5,013,096 | 5/1991 | Ocvirk et al. .................. 303/116 R |
| 5,026,124 | 6/1991 | Resch ............................. 303/116 R |

FOREIGN PATENT DOCUMENTS

| | | |
|---|---|---|
| 0321700 | 6/1989 | European Pat. Off. . |
| 3542689 | 6/1987 | Fed. Rep. of Germany . |
| 3635054 | 4/1988 | Fed. Rep. of Germany . |
| 2182991 | 11/1985 | United Kingdom . |
| 2192684 | 7/1986 | United Kingdom . |

OTHER PUBLICATIONS

Patent Abstracts of Japan-vol. 13 No. 183 Apr. 28, 1989.

Primary Examiner—Douglas C. Butler
Attorney, Agent, or Firm—Robert P. Seitter; J. Gordon Lewis

[57] ABSTRACT

A dual-circuit brake system including a diagonal division is provided by the invention. The brakes of the driven wheels, on the one hand, through inlet valves are in communication with the brake pressure generator and, on the other hand, through intake valves, are in direct communication with a pressure source. Moreover, communication is established with a reservoir through the outlet valves. For brake slip control purposes, pairs of inlet and outlet valves are actuated, while for traction slip control purposes, pairs of intake and outlet valves are actuated; during a traction slip control, the inlet valves and separator valves in bypass conduits leading to the inlet valves are closed. This circuit configuration involves the advantage that the intake and inlet valves may be provided with different diaphragms that are adjusted to the respective control mode. Providing the separator valves in the bypass conduits insures that the inlet valves are now inserted into the brake conduits that the pressure build-up during a normal non-controlled deceleration operation is substantially undisturbed.

8 Claims, 1 Drawing Sheet

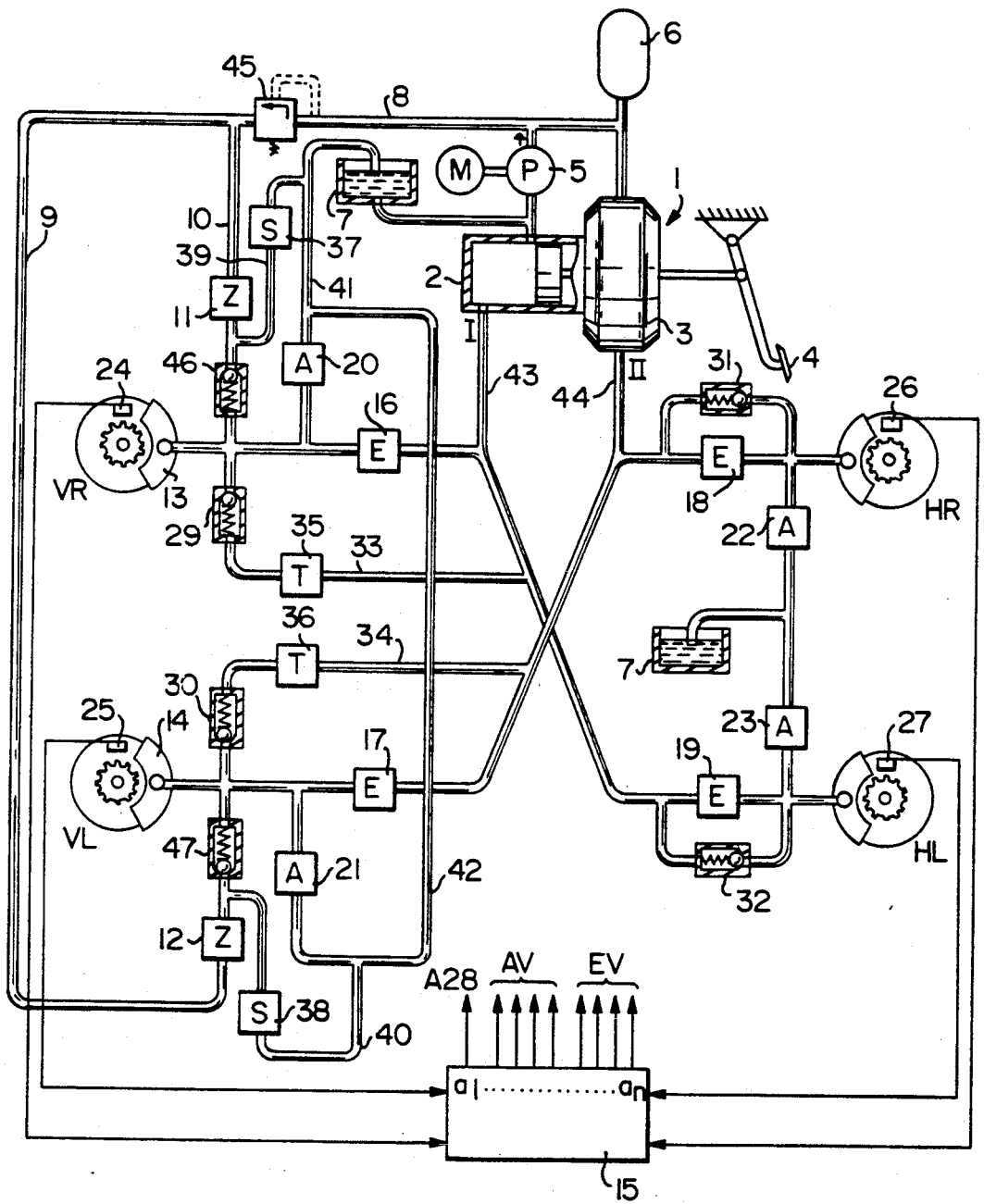

ized by the present invention is di-
HYDRAULIC BRAKE SYSTEM FOR AVOIDING HIGH BRAKE OR TRACTION SLIP VALUES

BACKGROUND OF THE INVENTION

The present invention is concerned with a hydraulic brake system for avoiding high brake or traction slip values. Brake systems of this type are disclosed, for example, by DE-OS 36 35 054. According to FIG. 1 of this Offenlegungsschrift, the brake system comprises a tandem master cylinder connected to the wheel brakes through branched brake conduits. Provided in each of the branch conduits is an inlet valve which is actuated electromagnetically. Moreover, each of the wheel brakes is in communication with a pressure fluid reservoir through a return conduit provided with an outlet valve. The outlet valve likewise is electromagnetically actuated. Each of the working chambers of the master cylinder is in communication with a pump. With the aid of this arrangement, the wheels can be prevented, during deceleration, from locking and an excessive brake slip from occurring. For this purpose, the inlet and outlet valves are actuated. Once the inlet valve is opened, pressure fluid flows from the pump into the wheel brake to thereby increase the brake pressure. Once the outlet valve is opened, pressure fluid will flow from the wheel brake into the pressure fluid reservoir to thereby cause the pressure in the wheel brake to decrease. By successively actuating the inlet and outlet valves, a pressure is adjustable in the wheel brakes that is in harmony with the forces transferred between tire and roadway to insure that the wheel has an optimum slip value.

It is known that anti-locking brake systems of this type also permit controlling traction slip. For that purpose, a separator valve is inserted into the branch conduit of the brake conduit leading to the wheel brake of the actuated wheel. The pressure fluid source, composed of pump and accumulator, is connected, through an intake valve, to the branch conduit between the separator valve and the inlet valve. In a control of the traction slip, in which racing of the wheels is to be avoided, the wheel brakes of the actuated wheels are connected directly to the pressure fluid source, with the separator valve preventing the pressure fluid from flowing back into the master brake cylinder. The pressure control is through actuation of the inlet and outlet valves, as it is in a control of brake slip.

Circuit configurations of this type have a number of disadvantages.

The inlet valves are provided with diaphragms which determine the rate of pressure increase. Throttlings of this type will be necessary to have a positive impact on the control pattern. The optimum throttling rates for a traction slip control and a brake slip control, respectively, vary. As the inlet valve is operative in both types of control, the selected size of the diaphragm is but a compromise which, in either case, results in a deterioration of the control quality.

Moreover, the brake conduit contains two valves, namely the inlet valve and the separator valve. The separator valve also causes an unavoidable throttling effect with the result that the wheel brakes, in the event of a rapid actuation of the brake pedal, respond only with a slowed-down or delayed effect.

SUMMARY OF THE INVENTION

The problem to which the present invention is directed is in so modifying the valve switching operation that in traction slip control and brake slip control, it will be possible to work on varying throttle patterns without increasing the number of valves, and that the separator will have no disturbing influence on the brake pressure build-up in a normal deceleration process.

During a brake slip control, the inlet valve in the brake conduit and the outlet valve are actuated.

During a traction slip control, the intake valve (forming the inlet valve) in the pressure conduit and the outlet valve are actuated. Depending on the type of control, a different inlet valve is actuated, thereby enabling the diaphragms in the valves to comply with the respective requirements.

As the separator valve is provided in the bypass conduit leading to the inlet valve, during a non-controlled deceleration process, pressure fluid only flows through the inlet valve. The separator valve has no disturbing influence.

Another advantage vis-à-vis the acknowledged state of art is that only one valve is contained in the brake conduit. The probability that the brake conduit, after a slip control, will remain blocked because the valve does not switch back, clearly, is reduced compared to the probability that one of two valves does not switch back.

Preferably, this system can be employed with an automotive vehicle comprising a diagonal brake circuit division. This means that the wheel brakes of wheels disposed on diagonally opposite sides of the automotive vehicle are associated with a brake circuit and that the wheels of an axle are driven.

In predetermined situations, such as changing from one control mode to the other, it may become necessary for the pressure in the wheel brakes to be rapidly decreased. For this purpose, a high-speed discharge valve is provided which connects the wheel brakes to the reservoir. The high-speed discharge valve has a large opening cross-section exceeding the opening cross-section of the actual outlet valve.

Morover, this will insure that in case of a defective intake valve, a buildup of pressure in the wheel brakes by inadvertence is precluded.

The present invention will not be described in greater detail with reference to one embodiment.

BRIEF DESCRIPTION OF THE DRAWING

The drawing schematically shows the major components of a brake system according to the present invention and the corresponding hydraulic circuit configuration for use with an automotive vehicle provided with a front wheel drive. However, the present invention can be readily employed with an automotive vehicle furnished with a rear wheel drive.

DETAILED DESCRIPTION OF THE INVENTION

The brake system as shown includes a dual-circuit hydraulic brake pressure generator 1 composed of a master brake cylinder 2 and a brake force booster 3. A brake pedal 4 for actuating the brake pressure generator 1 is symbolically shown. Also included is a high-pressure source comprised of a hydraulic pump 5 actuated by electromotive force, and a high-pressure accumulator 6.

The intake side of the pump is in communication with a pressure fluid reservoir 7. The pressure accumulator 6, through a pressure conduit 8 branched into two conduits 9 and 10, is in communication with the wheel brakes 13 and 14 of the front-sided right-hand wheel VR and of the front-sided left-hand wheel VL. Each of the branch conduits has an intake valve 11, 12 which is actuated electromagnetically and closed in its basic position.

The wheel brakes 13, 14, through respectively one inlet valve 16, 17, are in communication with the brake pressure generator 1.

The wheel brakes of the rear-sided right-hand wheel HR and of the rear-sided left-hand wheel HL, through respectively one inlet valve 18, 19, are in communication with the brake pressure generator 1, with the wheel brakes of the front-sided right-hand wheel VR and of the rear-sided left-hand wheel HL forming brake circuit I, and the wheel brakes of the front-sided left-hand wheel VL and of the rear-sided right-hand wheel HR forming brake circuit II. The inlet valves 16, 17, 18, 19 are disposed in respectively one branch conduit of the brake conduits 43, 44. Respectively, one check valve 29, 30, 31, 32 is connected in parallel to the inlet valves. The check valves open toward the brake pressure generator 1.

Each of the wheel brakes, moreover, through an outlet valve 20, 21, 22, 23, is in communication with the pressure fluid reservoir 7. While two reservoirs are shown to facilitate an explanation of the present invention, in practice the two form one unit.

The bypass conduits 33, 34 leading to the inlet valves 16 and 17 accommodating the check valves 29, 30, in addition, have separator valves 35, 36 which are electromagnetically actuated and open in their basic position.

Optionally, high-speed discharge valves 37, 38 may be additionally provided in discharge conduits 39, 40 between the wheel brakes 13, 14 and the reservoir 7.

The high-speed discharge valves are electromagnetically actuated and are open in their basic position. The branch conduits 9, 10 have check valves 46, 47 located between the terminations of the branch lines in the brake conduits 43, 44 and the intake valves. The check valves 46, 47 open toward the wheel brakes while the discharge conduits 39, 40 terminate into the branch conduits 9 and 10, respectively, at points between the intake valves 11 and 12, respectively, and the check valves 46 and 47, respectively.

The brake system operates on the following pattern:

In the basic position of the system, the inlet valves, the separator valves and the high-speed discharge valves are opened, whereas the intake valves and the outlet valves are closed. Upon actuation of the brake pedal, pressure is built up in brake circuits I and II and, through the brake conduits 43, 44, is passed to the wheel brakes. The brake pressure causes a delay in the speed of rotation of the wheel and, consequently, a deceleration of the automotive vehicle.

The rotating pattern of the wheels is permanently monitored by means of sensors 24, 25, 26, 27, thereby detecting immediately if one of the wheels tends to lock. The sensor signals are gathered by an electronic analyzer 15 generating signals for the valves. To prevent a wheel from locking, the associated inlet valve will be closed and the associated outlet valve opened. This will result in a pressure decrease in the wheel brake and in a re-acceleration of the wheel to enable a renewed pressure increase. For that purpose, the outlet valve will be closed again and the inlet valve reopened. Through the successive phases of pressure decrease and pressure increase, a pressure can be adjusted in the wheel brake which is in harmony with the transferrable forces between tire and road. It is the function of the check valves 29, 30, 31 and 32 to limit the pressure in the wheel brakes to the pressure value in the brake pressure generator 1. Once the driver, during a deceleration process, releases the pedal such that the pressure in the brake pressure generator is decreased or completely removed, the check valves will open causing the pressure decrease to become effective also in the wheel brakes. As a rule, the pressure is then under a locking pressure causing the brake slip control to be terminated.

Alternatively, the brake system also can be used to prevent the wheels from racing during a start-up operation and during travelling.

It may happen that the driving torque supplied by the engine to the wheels exceeds the forces and torques that can be transmitted by the wheel. As a consequence, the driving wheels would race, losing their lateral guiding forces.

Upon occurrence of such an event, first the inlet valve 16, 17 and the separator valve 35, 36 are blocked, thereby decoupling the wheel brakes 13, 14 from the brake pressure generator 1. In order to now enable a pressure to be built up in the wheel brake 13, 14, the intake valve 11 and 12, respectively, is opened, while the discharge valves 37, 38 are closed. The accumulator 6 is now in direct communication with the wheel brakes. Optionally, a pressure reducing valve 45 will control that a maximum pressure value be adjusted. Now it will be possible, irrespective of a pedal actuation, to decelerate the wheels of the actuated axle independently of one another. The traction slip control operates, basically, on the same pattern as a brake slip control. By opening and closing the intake valves 11, 12 and the outlet valves 20, 21, respectively, the pressure can be increased and decreased, so that the driving torque of the engine is compensated to such an extent as to be in harmony with the forces transferrable between tire and road. The intake valves 11, 12 have a function that corresponds to the one of the inlet valve 16, 17.

The functions of the discharge valves are as follows. Once an intake valve becomes defective, pressure fluid will flow from the accumulator into the brake circuits from where it will flow into the reservoir 7 which, with the pedal in non-actuated condition, is in communication with the master brake cylinder. However, the transfer from the reservoir to the master cylinder is substantially throttled so that, in a high leakage rate on the intake valve, a pressure will be built up in the brake circuits that is not intended. The additional discharge valve will safeguard that sufficient pressure fluid can flow off. The check valve, in a normal pressure buildup, will prevent pressure fluid from escaping through the discharge valve. This type of circuit configuration can, of course, be employed with all systems in which an accumulator is connectible to the brake conduit by means of a valve.

What is claimed:

1. A hydraulic brake system comprising:
a brake pressure generator;
a high-pressure source;
a drive wheel brake;
a non-driven wheel brake;
a pressure fluid reservoir for supplying pressure fluid;

and a brake circuit for controlling said driven wheel brake and said non-driven wheel brake and including:
- (a) a brake conduit extending between said driven and said non-driven wheel brakes and said brake pressure generator,
- (b) a first inlet valve in said brake conduit between said driven wheel brake and said brake pressure generator,
- (c) a second inlet valve in said brake conduit between said non-driven wheel brake and said brake pressure generator,
- (d) a return conduit extending between said driven and said non-driven wheel brakes and said pressure fluid reservoir,
- (e) a first outlet valve in said return conduit between said driven wheel brake and said pressure fluid reservoir,
- (f) a second outlet valve in said return conduit between said non-driven wheel brake and said pressure fluid reservoir,
- (g) a bypass conduit, bypassing said first inlet valve and extending between said (i) said driven wheel brake and said brake pressure generator, and (ii) said driven wheel brake and said non-driven wheel brake,
- (h) a check valve in said bypass conduit opening toward said brake pressure generator,
- (i) a pressure conduit extending between said driven wheel brake and said high-pressure source,
- (j) an intake valve in said pressure conduit, and
- (k) a separator valve in said bypass conduit for selectively preventing pressure fluid flow through said bypass circuit from said driven wheel brake during a traction slip control operation of said hydraulic brake system.

2. A hydraulic brake system according to claim 1 wherein said pressure conduit terminates in said brake conduit at the junction of said driven wheel brake and said first inlet valve.

3. A hydraulic brake system according to claim 2 wherein said driven wheel brake and said non-driven wheel brake are associated with diagonally opposed wheels of a four wheel vehicle.

4. A hydraulic brake system according to claim 1 further including:
- (a) a second driven wheel brake;
- (b) a second non-driven wheel brake;
- (c) a second brake circuit for controlling said second driven wheel brake and said second non-driven wheel brake and including:
  - (1) a second brake conduit extending between said second wheel brakes and said brake pressure generator,
  - (2) a third inlet valve in said second brake conduit between said second driven wheel brake and said brake pressure generator,
  - (3) a fourth inlet valve in said second brake conduit between said second non-driven wheel brake and said brake pressure generator,
  - (4) a second return conduit extending between said second wheel brakes and said brake pressure fluid reservoir,
  - (5) a third outlet valve in said second return conduit between said second driven wheel brake and said pressure fluid reservoir,
  - (6) a fourth outlet valve in said second return conduit between said second non-driven wheel brake and said pressure fluid reservoir,
  - (7) a second bypass conduit bypassing said third inlet valve,
  - (8) a second check valve in said second bypass conduit opening toward said brake pressure generator,
  - (9) a second pressure conduit extending between said second driven wheel brake and said high-pressure source,
  - (10) a second intake valve in said second pressure conduit, and
  - (11) a second separator valve in said second bypass conduit between said second driven wheel brake and said brake pressure generator.

5. A hydraulic brake system according to claim 4 wherein said second driven wheel brake and said second non-driven wheel brake are associated with a first pair of diagonally opposed wheels of a four wheel vehicle and the other said driven wheel brake and the other said non-driven wheel brake are associated with a second pair of diagonally opposed wheels of a four wheel vehicle.

6. A hydraulic brake system according to claim 5 further including:
- (a) a first discharge conduit extending from one of said driven wheel brakes to said pressure fluid reservoir, a second discharge conduit extending from the other of said driven wheel brakes to said pressure fluid reservoir,
- (c) a first high-speed discharge valve having a large opening cross-section and positioned in said first discharge conduit, and
- (d) a second high-speed discharge valve having a large opening cross-section and positioned in said second discharge conduit.

7. A hydraulic brake system according to claim 5 wherein said high-pressure source includes:
- (a) a pump in fluid communication with said pressure fluid reservoir, and
- (b) a high-pressure accumulator.

8. A hydraulic brake system according to claim 1 wherein said high-pressure source includes:
- (a) a pump in fluid communication with said pressure fluid reservoir, and
- (b) a high-pressure accumulator.

* * * * *

UNITED STATES PATENT AND TRADEMARK OFFICE
CERTIFICATE OF CORRECTION

PATENT NO. : 5,232,272
DATED : August 3, 1993
INVENTOR(S) : Volker Berisch and Derek Lowe It is certified that error appears in the above-identified patent and that said Letters Patent is hereby corrected as shown below:

Claim 1, column 4, line 66 - delete "drive" and replace with --driven--

Claim 6, column 6, line 41 - --(b)-- should be inserted before "a second discharge conduit extending from the other of said driven wheel brakes to said pressure fluid reservoir,"

Signed and Sealed this

Twenty-sixth Day of July, 1994

Attest:

BRUCE LEHMAN

Attesting Officer

Commissioner of Patents and Trademarks